US009523782B2

(12) United States Patent
Imhof

(10) Patent No.: US 9,523,782 B2
(45) Date of Patent: Dec. 20, 2016

(54) SYSTEM AND METHOD FOR DETECTION AND CLASSIFICATION OF SEISMIC TERMINATIONS

(71) Applicant: Matthias G. Imhof, Katy, TX (US)

(72) Inventor: Matthias G. Imhof, Katy, TX (US)

(73) Assignee: ExxonMobile Upstream Research Company, Houston, TX (US)

( * ) Notice: Subject to any disclaimer, the term of this patent is extended or adjusted under 35 U.S.C. 154(b) by 200 days.

(21) Appl. No.: 14/366,253

(22) PCT Filed: Jan. 11, 2013

(86) PCT No.: PCT/US2013/021179
§ 371 (c)(1),
(2) Date: Jun. 17, 2014

(87) PCT Pub. No.: WO2013/122704
PCT Pub. Date: Aug. 22, 2013

(65) Prior Publication Data
US 2014/0345857 A1    Nov. 27, 2014

Related U.S. Application Data

(60) Provisional application No. 61/598,233, filed on Feb. 13, 2012.

(51) Int. Cl.
*G01V 1/30* (2006.01)
*E21B 41/00* (2006.01)
*G01V 1/34* (2006.01)

(52) U.S. Cl.
CPC .......... *G01V 1/301* (2013.01); *E21B 41/0092* (2013.01); *G01V 1/345* (2013.01)

(58) Field of Classification Search
CPC .......... G01V 1/301; G01V 1/345; G01V 1/28; G01V 1/302; G01V 1/34; G01V 1/30; G01V 11/00; E21B 41/0092; G06K 9/6253
See application file for complete search history.

(56) References Cited

U.S. PATENT DOCUMENTS 4,916,615 A    4/1990    Chittimeni
4,992,995 A    2/1991    Favret
(Continued)

FOREIGN PATENT DOCUMENTS

WO    WO 99/64896    12/1999
WO    WO 2005/017564    2/2005
(Continued)

OTHER PUBLICATIONS

Barnes, A. (2000), "Attributes for Automating Seismic Facies Analysis," SEG Technical Program, *Expanded Abstracts*, pp. 553-556.
(Continued)

*Primary Examiner* — Manuel L Barbee
(74) *Attorney, Agent, or Firm* — ExxonMobile Upstream Research-Law Department

(57) ABSTRACT

The present disclosure provides a system and method for automatically identifying and classifying seismic terminations within a seismic data volume. A set of surfaces is obtained (step 303) describing the seismic data volume. A plurality of seismic terminations is identified within the set of surfaces (step 307). Based upon seismic attributes or geometric criterion, a termination direction can be determined (step 309) for at least one termination.

17 Claims, 9 Drawing Sheets

(56) References Cited

U.S. PATENT DOCUMENTS

| | | |
|---|---|---|
| 5,047,991 A | 9/1991 | Hsu |
| 5,265,192 A | 11/1993 | McCormack |
| 5,274,714 A | 12/1993 | Hutcheson et al. |
| 5,416,750 A | 5/1995 | Doyen et al. |
| 5,444,619 A | 8/1995 | Hoskins et al. |
| 5,465,308 A | 11/1995 | Hutcheson et al. |
| 5,539,704 A | 7/1996 | Doyen et al. |
| 5,570,106 A | 10/1996 | Viswanathan |
| 5,586,082 A | 12/1996 | Anderson et al. |
| 5,677,893 A | 10/1997 | de Hoop et al. |
| 5,852,588 A | 12/1998 | de Hoop et al. |
| 5,940,777 A | 8/1999 | Keskes |
| 6,012,017 A | 1/2000 | Van Bemmel et al. |
| 6,052,650 A | 4/2000 | Assa et al. |
| 6,226,596 B1 | 5/2001 | Gao |
| 6,236,942 B1 | 5/2001 | Bush |
| 6,295,504 B1 | 9/2001 | Ye et al. |
| 6,363,327 B1 | 3/2002 | Wallet et al. |
| 6,411,903 B2 | 6/2002 | Bush |
| 6,466,923 B1 | 10/2002 | Young |
| 6,473,696 B1 | 10/2002 | Onyia et al. |
| 6,526,353 B2 | 2/2003 | Wallet et al. |
| 6,574,565 B1 | 6/2003 | Bush |
| 6,574,566 B2 | 6/2003 | Grismore et al. |
| 6,618,678 B1 | 9/2003 | Van Riel |
| 6,625,541 B1 | 9/2003 | Shenoy et al. |
| 6,725,163 B1 | 4/2004 | Trappe et al. |
| 6,735,526 B1 | 5/2004 | Meldahl et al. |
| 6,751,558 B2 | 6/2004 | Huffman et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,786 B1 | 9/2005 | Sonneland et al. |
| 6,957,146 B1 | 10/2005 | Taner et al. |
| 6,970,397 B2 | 11/2005 | Castagna et al. |
| 6,977,866 B2 | 12/2005 | Huffman et al. |
| 6,988,038 B2 | 1/2006 | Trappe et al. |
| 7,006,085 B1 | 2/2006 | Acosta et al. |
| 7,053,131 B2 | 5/2006 | Ko et al. |
| 7,092,824 B2 | 8/2006 | Favret et al. |
| 7,098,908 B2 | 8/2006 | Acosta et al. |
| 7,162,463 B1 | 1/2007 | Wentland et al. |
| 7,184,991 B1 | 2/2007 | Wentland et al. |
| 7,188,092 B2 | 3/2007 | Wentland et al. |
| 7,203,342 B2 | 4/2007 | Pederson |
| 7,206,782 B1 | 4/2007 | Padgett |
| 7,222,023 B2 | 5/2007 | Laurenet et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,295,706 B2 | 11/2007 | Wentland et al. |
| 7,295,930 B2 | 11/2007 | Dulac et al. |
| 7,308,139 B2 | 12/2007 | Wentland et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,658,202 B2 | 2/2010 | Wiley et al. |
| 7,697,373 B1 | 4/2010 | Padgett |
| 7,881,501 B2 | 2/2011 | Pinnegar et al. |
| 8,010,294 B2 | 8/2011 | Dorn et al. |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,969 B2 | 2/2012 | Chan et al. |
| 8,128,030 B2 | 3/2012 | Dannenberg |
| 8,219,322 B2 | 7/2012 | Monsen et al. |
| 8,326,542 B2 | 12/2012 | Chevion et al. |
| 8,346,695 B2 | 1/2013 | Peper et al. |
| 8,358,561 B2 | 1/2013 | Kelly et al. |
| 8,363,959 B2 | 1/2013 | Boiman et al. |
| 8,380,435 B2 | 2/2013 | Kumaran et al. |
| 8,385,603 B2 | 2/2013 | Beucher et al. |
| 8,447,525 B2 | 5/2013 | Pepper et al. |
| 8,463,551 B2 | 6/2013 | Aarre |
| 8,515,678 B2 | 8/2013 | Pepper et al. |
| 2005/0137274 A1 | 6/2005 | Ko et al. |
| 2005/0171700 A1 | 8/2005 | Dean |
| 2005/0288863 A1 | 12/2005 | Workman |
| 2006/0115145 A1 | 6/2006 | Bishop |
| 2006/0184488 A1 | 8/2006 | Wentland |
| 2007/0067040 A1 | 3/2007 | Ferree |
| 2008/0123469 A1 | 5/2008 | Wibaux et al. |
| 2008/0175478 A1 | 7/2008 | Wentland et al. |
| 2008/0270033 A1 | 10/2008 | Wiley et al. |
| 2010/0149917 A1 | 6/2010 | Imhof et al. |
| 2010/0174489 A1 | 7/2010 | Bryant et al. |
| 2010/0211363 A1 | 8/2010 | Dorn et al. |
| 2010/0245347 A1 | 9/2010 | Dorn et al. |
| 2011/0042098 A1 | 2/2011 | Imhof |
| 2011/0048731 A1 | 3/2011 | Imhof et al. |
| 2011/0307178 A1 | 12/2011 | Hoekstra |
| 2012/0072116 A1 | 3/2012 | Dorn et al. |
| 2012/0090001 A1 | 4/2012 | Yen |
| 2012/0117124 A1 | 5/2012 | Bruaset et al. |
| 2012/0150447 A1 | 6/2012 | Van Hoek et al. |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0257796 A1 | 10/2012 | Henderson et al. |
| 2012/0322037 A1 | 12/2012 | Raglin |
| 2013/0006591 A1 | 1/2013 | Pyrcz et al. |
| 2013/0064040 A1* | 3/2013 | Imhof ................ G01V 1/30 367/73 |
| 2013/0138350 A1* | 5/2013 | Thachaparambil .... G01V 1/302 702/16 |
| 2013/0158877 A1 | 6/2013 | Bakke et al. |

FOREIGN PATENT DOCUMENTS

| | | |
|---|---|---|
| WO | WO 2010/142659 | 12/2010 |
| WO | 2011/149609 | 12/2011 |

OTHER PUBLICATIONS

Randen, T. et al. (1998), "New Seismic Attributes for Automated Stratigraphic Facies Boundary Detection," SEG Technical Program, *Expanded Abstracts*, pp. 628-631.

\* cited by examiner

Truncation

Toplap

Onlap

Downlap

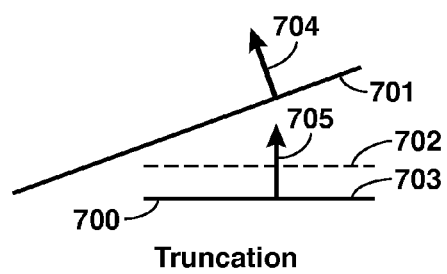
FIG. 7A Truncation
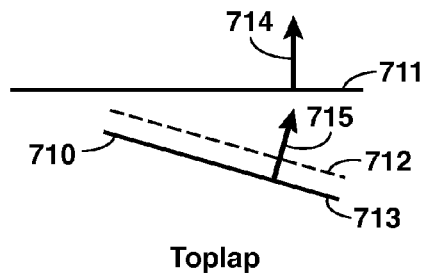
FIG. 7B Toplap
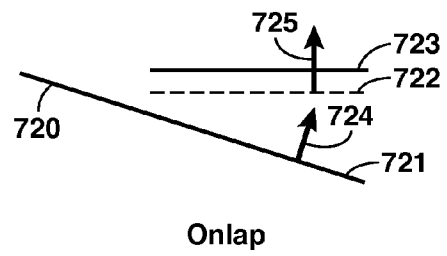
FIG. 7C Onlap
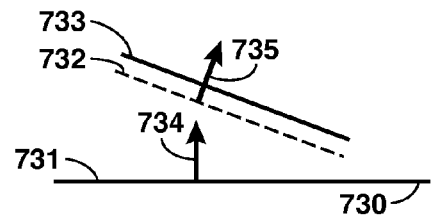
FIG. 7D Downlap

SYSTEM AND METHOD FOR DETECTION AND CLASSIFICATION OF SEISMIC TERMINATIONS

CROSS-REFERENCE TO RELATED APPLICATION

This application is the National Stage of International Application No. PCT/US2012/021179, that published as WO 2013/122704, filed 11 Jan. 2013, which claims the benefit of U.S. Provisional Application No. 61/598,233, filed 13 Feb. 2012, each of which is incorporated herein by reference, in its entirety, for all purposes.

FIELD OF INVENTION

This invention generally relates to the field of seismic prospecting and reservoir delineation and, more particularly, to a system and method to identify and classify seismic terminations.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Seismic stratigraphy analyzes sediments and sedimentary rocks in a geometrical context derived from seismic reflections. A typical first step is the separation of seismic-sequence units which is usually done by mapping significant surfaces from where they are indicated by terminations of seismic reflections or seismic reflections with different orientation butting into each other. A second step is the characterization of these seismic-sequence units, a process aided by prior determination and classification of the terminations as truncation, toplap, onlap or downlap. Picking and classifying terminations is traditionally a manual task where the interpreter examines the data and marks terminations, for example with a little arrow.

Existing methods for computer-assisted seismic stratigraphy relate to the detection of convergences in seismic images or sections. Representative examples thereof are disclosed by T. Randen et al., "New Seismic Attributes for Automated Stratigraphic Facies Boundary Detection", SEG Technical Program, Expanded Abstracts, pp. 628-631, 1998 and A. Barnes, "Attributes for Automating Seismic Facies Analysis", SEG Technical Program, Expanded Abstracts, pp. 553-556, 2000.

Both of these methods share the need for preliminary determination of a "field of directional vectors" at every pixel of the data. In Barnes' work, quantification of the reflectors convergence is obtained by calculating the divergence of the field of directional vectors. In Randen's work, the directional field is subjected to a search for flowlines whose density expresses the divergence or the convergence of the reflectors. Neither method involves a notion of a surface that separates two stratigraphic units formed under different sedimentological conditions.

In Randen's case, terminations can be defined as locations where flowlines intersect or approximately merge. With an appropriately chosen flowline density, the intersections pinpoint the boundaries by virtually continuous lines, provided sufficient quality and clarity of the seismic data. Randen et al., however, discloses neither further details on requirements for data quality and data clarity nor specifics about flowline generation or intersection detection. In Barnes' case, terminations are best defined in terms of termination density without ability for further classification.

Neither case allows for the automatic detection and classification of individual terminations. Thus, there is a need for improvement in this field.

SUMMARY OF THE INVENTION

The present invention provides a system and method for detecting and classifying seismic terminations.

One embodiment of the present disclosure is a computer-implemented method for analyzing a seismic data volume acquired in a seismic survey to determine potential for hydrocarbon accumulations in an associated subsurface region, the method comprising: obtaining surfaces describing the seismic data volume; identifying edge points within the surfaces; identifying a plurality of seismic terminations, wherein each termination is defined by two edge points defining a first terminated surface and a second terminated surface; and using a computer to determine a termination direction for at least one termination.

Another embodiment of the present disclosure is a computer-implemented method for analyzing a seismic data volume acquired in a seismic survey to determine potential for hydrocarbon accumulations in an associated subsurface region, the method comprising: obtaining a set of surfaces describing the seismic data volume; identifying a plurality of seismic terminations within the set of surfaces; and using a computer to determine a termination direction for at least one termination.

The foregoing has broadly outlined the features of some embodiments of the present invention in order that the detailed description that follows may be better understood. Additional features and embodiments will also be described herein.

BRIEF DESCRIPTION OF THE DRAWINGS

The present invention and its advantages will be better understood by referring to the following detailed description and the attached drawings.

FIGS. 7A-7D demonstrate the use of relative steepness of terminated and persistent surfaces to differentiate between truncation (FIG. 7A), toplap (FIG. 7B), onlap (FIG. 7C), and downlap (FIG. 7D).

Figure 1A:
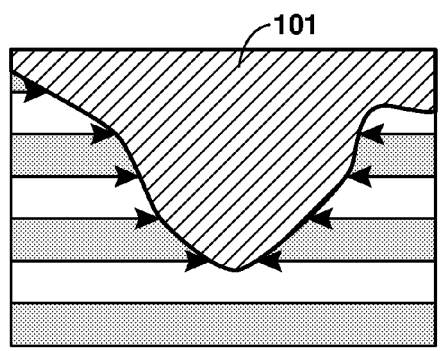
FIGS. 1A-1D depict examples of the four classic stratigraphic termination types: truncation (FIG. 1A), toplap (FIG. 1B), onlap (FIG. 1C), and downlap (FIG. 1D).

It should be noted that the figures are merely examples of several embodiments of the present invention and no limitations on the scope of the present invention are intended thereby. Further, the figures are generally not drawn to scale, but are drafted for purposes of convenience and clarity in illustrating various aspects of certain embodiments of the invention.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Persons skilled in the technical field will readily recognize that in practical applications of the disclosed methodology, it must be performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps sometimes require physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "obtaining", "generating", "identifying", "determining", and "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Seismic stratigraphy is a branch of stratigraphy in which sediments and sedimentary rocks are interpreted in a geometrical context from seismic reflectors. Seismic-sequence analysis separates seismic data into seismic-sequence units or seismic-facies units. This separation is often done by mapping unconformities where they are indicated by angularity or seismic reflections with different orientation terminating each other. The unconformities are then extended to where they cannot be identified in this manner by following along reflections, advantage being taken of the fact that the unconformity reflection is often relatively strong. The interpretation of the seismic-sequence units is aided by analysis of the terminations, or locations where reflections end.

In order to aid in the understanding of the present disclosure, a brief discussion of terminations is provided below. As understood by those of ordinary skill in the art, a termination type is based on the manner in which reflections come to an end. Lapout is the lateral termination of a reflection or associated stratal unit when it becomes too thin to be resolved. Truncation, on the other hand, is the lateral termination of a reflection or associated stratal unit when other strata cut it off.

Figure 1B:
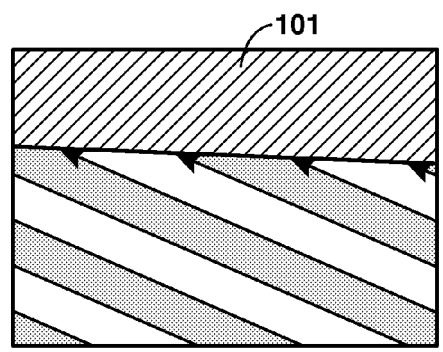
Figure 1C:
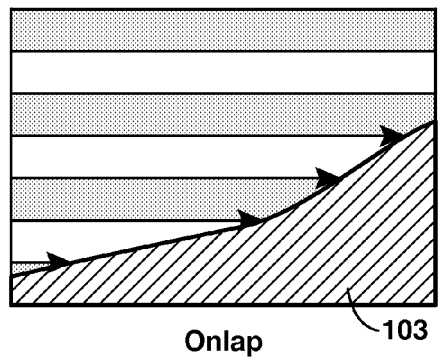
Figure 1D:
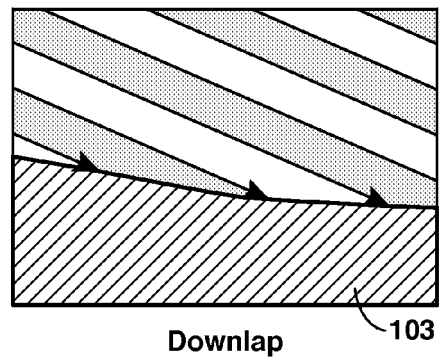

Four classic termination types are depicted in FIGS. 1A-1D. FIG. 1A depicts a truncation, FIG. 1B depicts a toplap, FIG. 1C depicts an onlap, and FIG. 1D depicts a downlap. As demonstrated by the figures, truncations and toplaps are terminations against an upper boundary, or unit, 101, while onlap and downlap are terminations against a lower boundary 103.

As demonstrated in FIG. 1A, truncation is the lateral termination of a reflection by erosion. It occurs at the upper boundary 101 of a depositional sequence and may extend over a wide regional area or be confined to a local scour. As used throughout the present disclosure, a truncation is defined as termination of a relatively flat reflection by a relatively steep reflection.

Structural truncation is the lateral termination of a unit, or surface, by structural disruption. Such truncation is most easily recognized where it cuts across a stack of concordant units or surfaces. Often, the disruption is caused by faulting. At times, the distinction between erosional and structural truncation can be difficult. For the purpose of understanding the principles of the disclosed system and method, erosional and structural truncations are not distinguished and may both be referred to as a truncation.

As demonstrated in FIG. 1B, a toplap is a lapout at the upper boundary 101 of a depositional unit. Initially inclined strata, such as clinoforms or bar forms, may show this relation. Often, lateral terminations may taper, updip and asymptotically approach the upper boundary. Due to limited resolution on seismic sections, reflections may appear to terminate abruptly at a high angle against the upper, relatively horizontal surface. As used throughout the present disclosure, a toplap is defined as the updip termination of an inclined reflection against a relatively flat reflection.

Subsequent structural deformation can change the reflection orientations and may even convert a truncation to an apparent toplap or may convert a toplap to an apparent truncation. As used throughout the present disclosure, the term "upward termination" is used to describe a termination against an upper unit or surface 101. Thus, an upward termination denotes either an (apparent) truncation or an (apparent) toplap. Throughout this disclosure, the word "apparent" is typically suppressed because all termination terminations and classifications are apparent since they are based primarily on geometry, dip and/or other seismic attributes.

For the case of an onlap and as depicted in FIG. 1C, either an initially horizontal unit laps out against an initially inclined surface, or an initially inclined unit laps out updip against a surface of greater initial inclination. For the case of downlap and as depicted in FIG. 1D, an initially inclined unit terminates downdip against an initially horizontal surface or surface of lesser initial inclination. Onlap or downlap can usually be readily identified based on their differences in orientation. Subsequent structural deformation can change their orientations and may even convert an onlap to an apparent downlap or may convert a downlap to an apparent onlap. As used throughout the present disclosure, the term "downward termination" is used to describe a termination against a lower unit or surface. Thus, a downward termination denotes either a downlap or an onlap.

As used throughout the present disclosure, a seismic termination is defined as the location where a seismic event such as a peak (local maximum) or trough (local minimum) ends. In a seismic cross section or seismic volume, however, an event rarely just ends. Rather, the event terminates or disappears by merging with another event. However, a seismic peak being a local maximum on a seismic trace cannot disappear unless a vertically adjacent trough disappears, too. Otherwise, there would be two vertically adjacent local minima left without an in-between local maximum, which is impossible. Similarly, a seismic trough being a local minimum on a seismic trace cannot disappear unless a vertically adjacent peak or local maximum disappears, too. Otherwise, there would be two vertically adjacent local maxima left without an in-between local minimum, which is again impossible. Thus, events defined by correlated peaks and troughs terminate in pairs.

Figure 2:
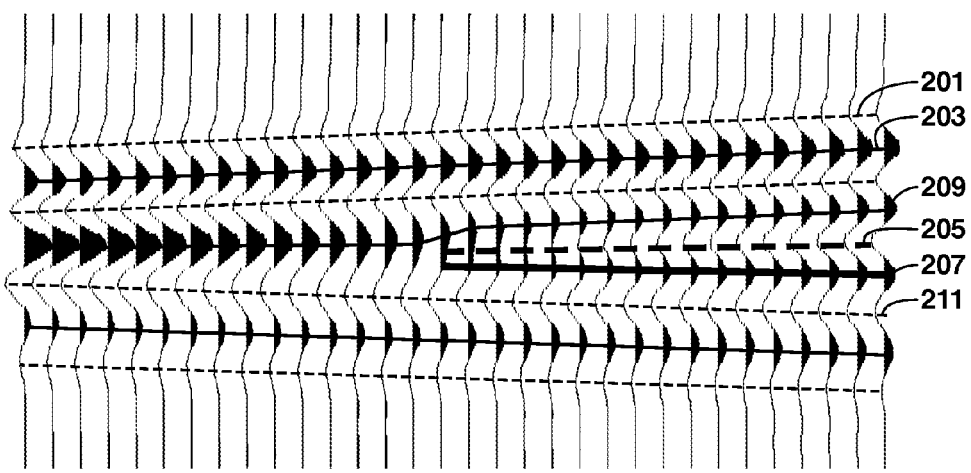
FIG. 2 depicts an example of a termination of two seismic surfaces.

FIG. 2 illustrates this behavior with a synthetic seismic wedge model. Persistent surfaces defined by correlated trough events are designated with light dashed lines 201 and persistent surfaces defined by correlated peak events are designated with light solid lines 203. The adjacent surfaces drawn as heavy dashed lines 205 and solid lines 207 (correlated trough or peak events, respectively) terminate at the same lateral location. The edge points of surfaces 205 and 207 are located in adjacent peak and trough events of the same trace, and thus are deemed to be valid terminations. If the surfaces 205 and 207 had been mistracked by splitting them into smaller patches, then the edge points are likely to be non-adjacent and/or in different traces which allows classifying these edge points as being invalid. As will be discussed in more detail below, one aspect of the present disclosure is the determination of whether 205 and 207 are truncated by the light solid line 209 or by the light dashed line 211, i.e., determination whether the termination direction is upwards or downwards. It is easy to see that 205 and 207 merge into 209 while 211 does not show any indication on the presence and termination of 205 and 207. Thus, the termination direction is determined to be upwards, surface 209 is termed the persistent surface, and surfaces 205 and 207 are termed the terminated surfaces.

Figure 3:
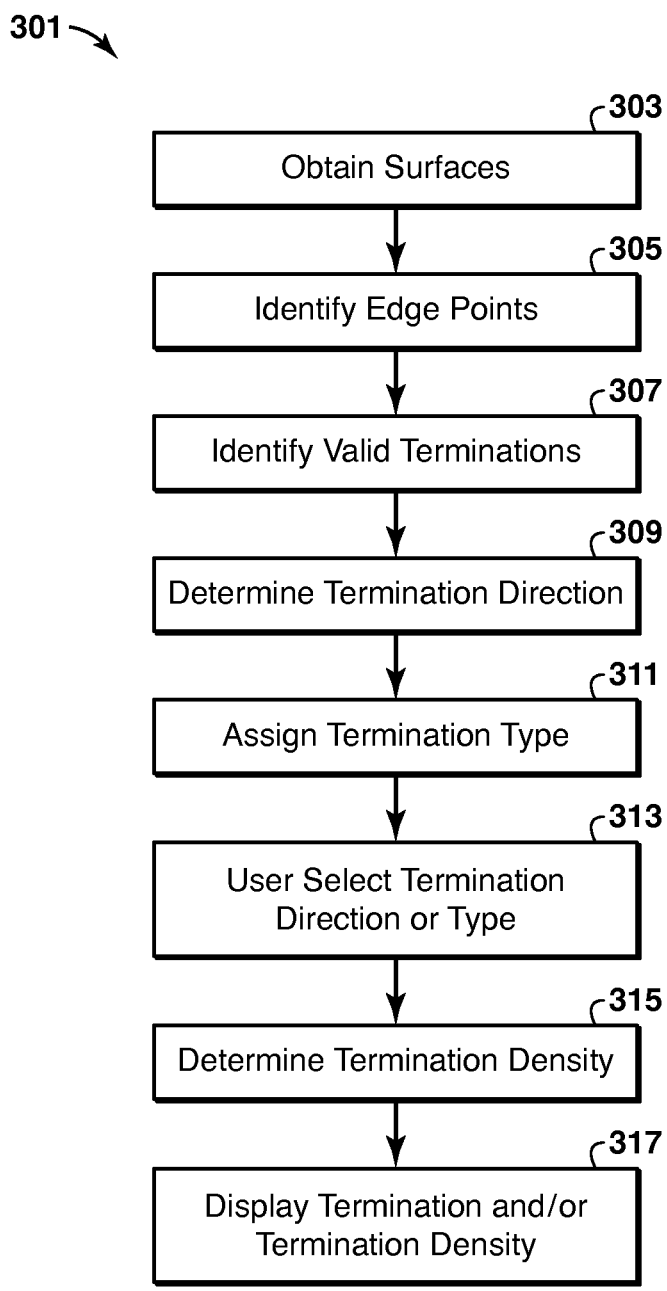
FIG. 3 is a flow chart showing the basic steps of automatic termination type classification according to one embodiment of the present disclosure.

The flow chart of FIG. 3 will be referred to in describing one embodiment of the present disclosure. While each step will be described in further detail below, the depicted process (301) first obtains a set of surfaces (303) which describe a seismic data volume acquired in a seismic survey. Edge points are then identified (305) within the set of surfaces. Valid terminations are identified (307) and the valid terminations are then evaluated to determine a termination direction (309). The process may continue by further evaluating the terminations to determine and assign a termination type (311) to each valid termination. A user may then select at least one particular termination direction or type (313). The process may continue by determining a termination density (315) for the selected termination direction or type. The selected termination direction, type, and/or density may then be displayed to the user (317). In some embodiments of the present disclosure, the order of steps 303-317 may be changed, at least one step may be repeated, and/or at least one step may not be performed. For example, one embodiment of the present disclosure performs only steps 303-307.

As noted above, one embodiment of the disclosed method begins by obtaining a set of surfaces (303). U.S. patent application Ser. No. 12/920,013, titled "Seismic Horizon Skeletonization" to Imhof et al., which is incorporated by reference in its entirety, discloses an algorithm that extracts essentially every event from a seismic dataset and assigns these events to surfaces. In one embodiment, such skeletonization techniques are used to derive seismic surfaces from a seismic data volume. Different embodiments may extract or obtain seismic surfaces using other techniques, such as, but not limited to, tracking peaks and/or troughs or either kind of zero crossings (+/− or −/+). Other methods for generating or obtaining a large set of surfaces from a seismic data volume include those taught by U.S. Pat. No. 7,248,539, titled "Extrema Classification" to Borgos; U.S. Pat. No. 5,570,106, titled "Method and Apparatus for Creating Horizons from 3-D Seismic Data" to Viswanathan; and U.S. Patent Application Publication No. 2008/0285384, titled "System and Method for Displaying Seismic Horizons with Attributes" to James. The disclosed system and method is not limited to a particular way of tracking, generating or obtaining surfaces. In one embodiment, all peak and trough surfaces are extracted.

At step 305, edge points are then identified within the set of surfaces. Depending on the desired connectivity of the surface, an edge point may be defined as a point that is not surrounded by four or eight points that belong to the same surface. With this edge point definition, every tiny hole inside a given surface creates additional edge points. In one embodiment, holes within surfaces are left untouched as many holes attributed to mistracked events will be deemed invalid edge points because they violate the requirement of two adjacent edge points within one trace. Small perturbations in amplitudes and waveforms can also lead to holes within surfaces. In some embodiments, interior holes are filled and thus removed, for example, by interpolation. In some embodiments, only a subset of the interior holes are filled, such as, but not limited to, holes that match a user-specified criteria. Such user-specified criteria may include holes having an insufficient size and/or having a particular shape.

Valid terminations are identified at step 307. In one embodiment, valid terminations are determined by filtering edge points determined to be unassociated with stratigraphic terminations. One potential filtering operation is to discard edge points interior to a surface. Another potential filtering operation is to remove edge points that do not occur strictly in vertically-stacked pairs. FIG. 2 demonstrates that acceptable terminations occur in pairs because both a peak and a trough surface terminate at the same location. In the presence of noise or coherent imaging artifacts, the skeletonization algorithm disclosed in U.S. application Ser. No. 12/920, 013 can break surfaces into smaller pieces, thereby generating artificial terminations along their edges. Such artificial terminations can be recognized because there rarely is one vertically adjacent companion termination as required for a valid termination. Another filtering operation relates to seismic noise that can introduce vertical trains of events, and thus trains of potential terminations. Nevertheless, such noise-train terminations can be distinguished from valid terminations because they appear in vertical trains and not just in simple pairs as required for valid stratigraphic terminations. In some embodiments, a majority of the edge points and potential terminations identified within the obtained set of surfaces can be discarded as a result of step 307 because they do not appear in strictly vertically adjacent pairs. Regardless of the filtering operation utilized, the remaining edge points are, therefore, associated with valid stratigraphic terminations.

Process 301 proceeds by determining a termination direction (step 309) for each valid termination. In other words, the next step after the identification of valid edge points and terminations (or after the rejection of invalid edge points and terminations) is the recognition of whether a terminating event merges with the upper or lower event. In some embodiments, the termination direction is determined for some, but not all, valid terminations. The determination of termination direction may be based on a seismic attribute and/or geometric criterion. In some embodiments, seismic amplitude is used to determine the termination direction by directing the termination toward the stronger of the two adjacent persistent surfaces. In some embodiments, the termination is directed toward the adjacent persistent surface that exhibits a broader waveform or toward the one that exhibits a lower dominant frequency. In some embodiments, a waveform attribute is used to direct the termination. One example of such an embodiment exploits an anomaly of the waveform to assign the termination direction, namely the presence of a doubled waveform.

U.S. patent application Ser. No. 12/920,285, titled "Method For Geophysical And Stratigraphic Interpretation Using Waveform Anomalies", to Imhof, which is incorporated by reference in its entirety, discloses an interpretation method that exploits an anomalous waveform to determine locations where a seismic wavelet separates to create a set of two additional events. At times, a doubled waveform appears when one seismic wavelet is about to separate into two events. Such a doubled waveform constitutes a waveform anomaly. In one embodiment, the location and/or geometry of the wavelet separation is used to determine termination direction.

Figure 4:
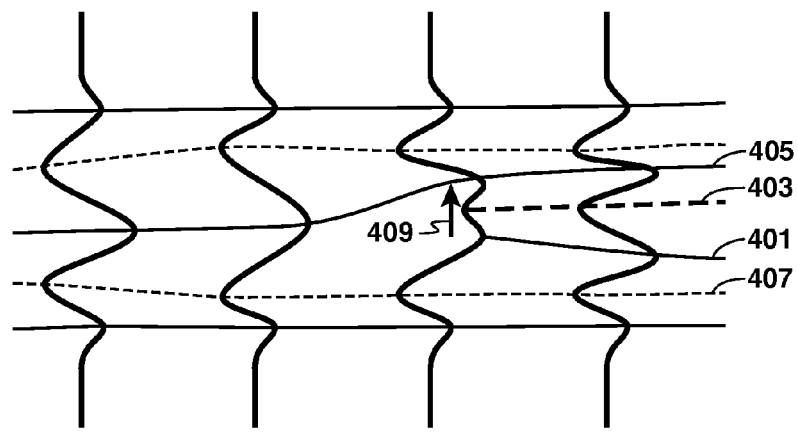
FIG. 4 demonstrates the recognition of an upward termination according to one embodiment of the present disclosure.

FIG. 4 shows a vanishing waveform-maximum event 401 terminating in an ordinary maximum. Vanishing waveform-minimum event 403, however, ends in a doublet. As used throughout the present disclosure, a doublet is either a local waveform minimum with positive value or a local waveform maximum with a negative value. In contrast, a nondoublet is used herein to describe an ordinary maximum or minimum event.

With respect to FIG. 4, event 401 is considered a nondoublet. In this case, event 403 is a local waveform minimum with a positive value, and thus a doublet. As illustrated, events 401 and 403 are likely to be terminated by the above waveform-maximum event 405 and not the beneath waveform-minimum event 407. In other words, events 401, 403 and 405 all feed into the same wiggle at the termination, and events 401 and 403 are likely to terminate into 405. On the other hand, events 401, 403, and 407 feed into two different wiggles of opposing polarity; therefore, event 401 and 403 are unlikely to terminate into 407. Thus, the upward termination 409 is placed where events 401 and 403 vanish. Note that changing the waveform polarities also leads to an upward termination.

Figure 5:
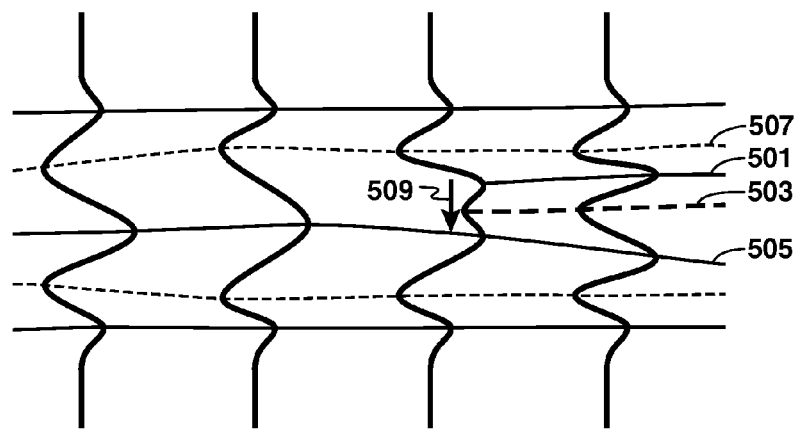
FIG. 5 demonstrates the recognition of a downward termination according to one embodiment of the present disclosure.

FIG. 5 shows the case of a vanishing waveform-maximum event 501 terminating in an ordinary maximum. Vanishing waveform minimum 503, however, ends in a doublet of a local waveform-minimum with positive value. Due to the arrangement of the terminated surfaces, events 501 and 503 are likely to be terminated by the beneath waveform-maximum event 505 and not the above waveform-minimum event 507. Thus, downward termination 509 is placed where events 501 and 503 vanish. Again, note that changing the waveform polarities leads to a downward termination.

Therefore, in one embodiment of the present disclosure, the presence of the doublet waveform allows determination of the termination direction. For two vertically adjacent edge points where one of the edge points lies on a waveform doublet and the other edge point lies on a waveform nondoublet, the termination direction is from the nondoublet to the doublet. Thus, if the nondoublet is below the doublet, then the termination direction is upward. However, if the nondoublet is above the doublet, then the termination direction is downward.

Figure 6:
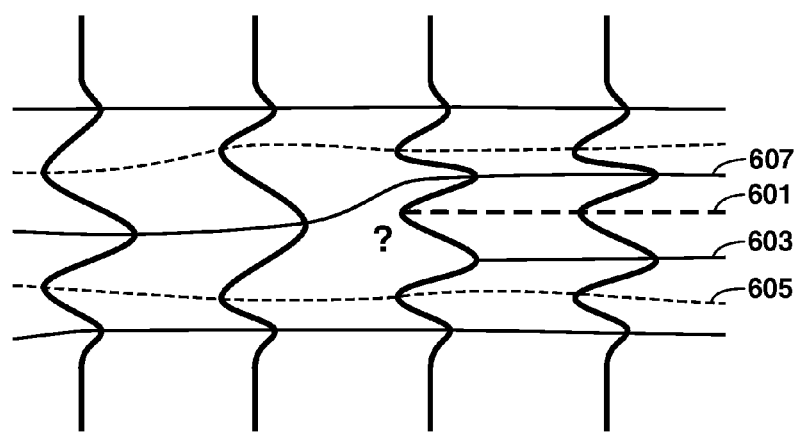
FIG. 6 demonstrates the recognition of an undefined termination direction according to one embodiment of the present disclosure.

FIG. 6 shows a case where the waveform-minimum event 601 ends with a regular minimum and the waveform-maximum event 603 ends with a regular maximum. Thus, the termination direction cannot be determined by exploitation of the doublet waveform. In one embodiment, the termination is deemed to be an undefined termination with undefined direction. In another embodiment, event 601 may be deemed an upward termination, while event 603 is deemed a downward termination. As a result, the termination defined by events 601 and 603 is defined as both upward and downward. Lacking a doubled waveform to determine the termination direction, some embodiments of the present disclosure may employ other properties of the obtained surfaces or other seismic attributes to determine termination direction. In some embodiments, the user may elect to use another criterion even if doubled waveforms are available. In one embodiment, events 601 and 603 may be deemed to be truncated by the stronger of events 605 or 607. An event may be found to be "stronger" based on its seismic amplitude within the seismic trace containing the terminated surface edge points. In another embodiment, an event may be found to be "stronger" based on its seismic amplitudes average for events belonging to the same surface but within a user-specified distance from the termination. A particular case of this embodiment is to define event strength by forming the average of all events belonging to the same surface. Another example is the use of seismic loop duration where the termination direction for the 601 and 603 events are defined toward the surface 605 or 607 with the broader wavelet, i.e., the wavelet with the longer duration or lower dominant frequency. Indeed, any attribute, such as, but not limited to, amplitude, shape, or geometry, may be used to define the direction of termination.

Returning again to process 301, step 311 determines the termination type for at least one termination. More specifically, the upward terminations may be classified as truncations or toplaps, while the downward terminations may be classified as onlaps or downlaps. In one embodiment of the present disclosure, the termination type determination is made based on a comparison of the relative surface orientations, i.e., the two surfaces that are terminated and the persistent surface that terminates the others. In such an embodiment, the first step is to estimate the surface normal direction of at least one of the terminated surfaces as well as the persistent surface near the termination. The normal directions may be determined by fitting the nearby points with a plane. The directions of these surfaces are then compared. Based on this comparison as well as the termination direction, the termination type may then be determined and assigned.

FIGS. 7A-7D demonstrate the use of relative steepness of terminated and persistent surfaces to differentiate termination type. FIG. 7A shows surface 701 cutting off surfaces 702 and 703 from above. Because the dip 704 of surface 701 is greater than the dip 705 of surfaces 702 and 703, the termination 700 is classified to be an truncation. Therefore, for a truncation, the persistent surface is steeper than the terminated surfaces.

FIG. 7B shows surface 711 cutting off surfaces 712 and 713 from above. Because the dip 714 of surface 711 is lesser than the dip 715 of surfaces 712 and 713, the termination 710 is classified to be a toplap. Therefore, for toplaps, the terminated surfaces are steeper than the persistent one. In FIG. 7C, surface 721 cuts off surfaces 722 and 723 from below. Because the dip 724 of surface 721 is greater than the dip 725 of surfaces 722 and 723, the termination 720 is classified to be an onlap. Therefore, for onlaps, the persistent surface is steeper than the terminated ones. Lastly and as shown in FIG. 7D, surface 731 cuts off surfaces 732 and 733 from below. Because the dip 734 of surface 731 is lesser than the dip 735 of surfaces 732 and 733, the termination 730 is classified to be a downlap. Therefore, for downlaps, the terminated surfaces are steeper than the persistent one.

Proceeding through process 301 depicted in FIG. 3, a user then selects at least one termination direction or type (step 313) of interest, such as upward terminations or toplaps and onlaps. In some embodiments, the user also specifies a window size. In one embodiment, the user may input his/her selection into a computer or other electronic device using user interfaces known to or understood by those of ordinary skill in the art.

At step 315, a termination density is determined for the selected termination direction or type. In one embodiment, an algorithm counts at specified points how many terminations of the specified direction or type are contained in a window of the specified size anchored at that point. In some embodiments, essentially every point of the seismic data volume anchors such a window. In some embodiments, the count is unweighted thereby providing the actual number of terminations of the specified type within the window. In another embodiment, the contribution of each termination is weighted, such as, but not limited to, with respect to its distance from the window center or anchor point. Either embodiment may be implemented by convolution of a binary indicator volume for the specified termination direction or type with an appropriate filter.

Step 317 displays the results for review or analysis. In one embodiment, terminations of the selected termination type are superimposed over a seismic section extracted from the seismic data volume. One suitable method of visualization is optical smashing of the individual terminations. In an optical smash, terminations outside a specified region are rendered transparent. Terminations within that region are rendered and typically color coded by termination type. Optical smashing demonstrates that terminations tend to cluster by termination type. In one embodiment, the optically smashed terminations are co-rendered with seismic amplitudes or a seismic section extraction from the seismic data volume, which facilitates high-resolution seismo-stratigraphic interpretation of essentially every seismic surface.

As described herein, terminations are located and defined on the terminated surfaces. In one embodiment of the present disclosure, the terminations are relocated from the terminated surfaces to the persistent surfaces which cut the terminated surfaces. Relocating the terminations in this manner allows classifying surfaces as unconformities or flooding surfaces. In one embodiment, a surface that predominantly contains relocated truncations is classified as an unconformity. A surface that predominantly contains relocated downlaps is likely to be a flooding surface.

Figure 8:
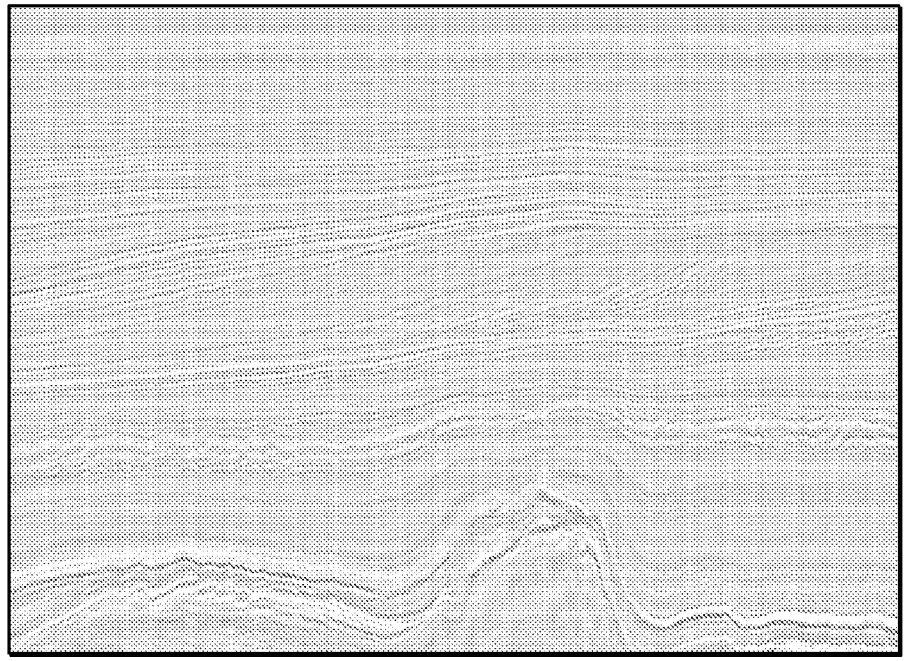
FIG. 8 depicts a seismic cross section from a processed seismic data volume.
Figure 9:
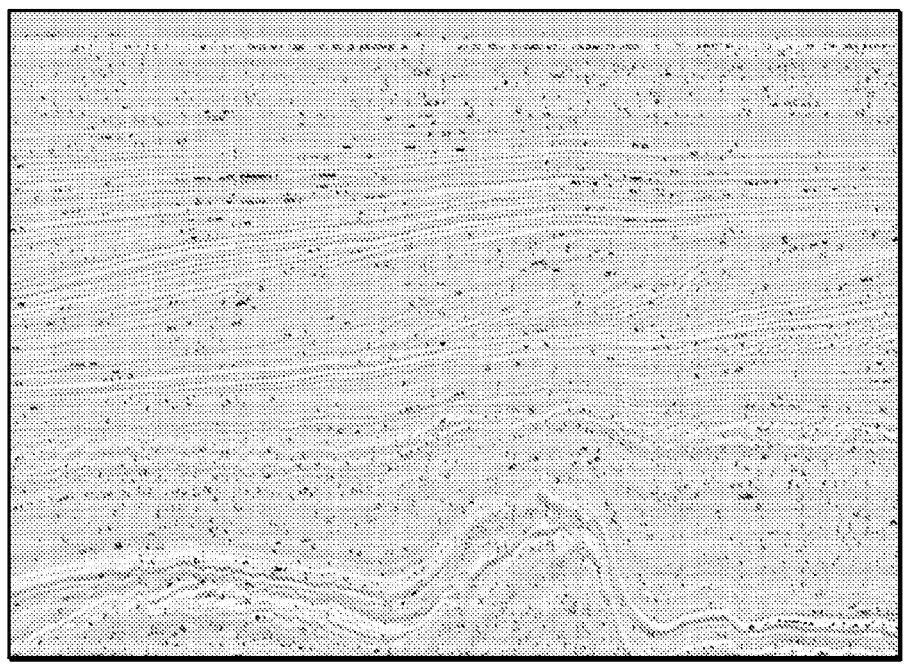
FIG. 9 depicts the seismic cross section of FIG. 8 superimposed with truncations which have been identified according to one embodiment of the present disclosure.
Figure 10:
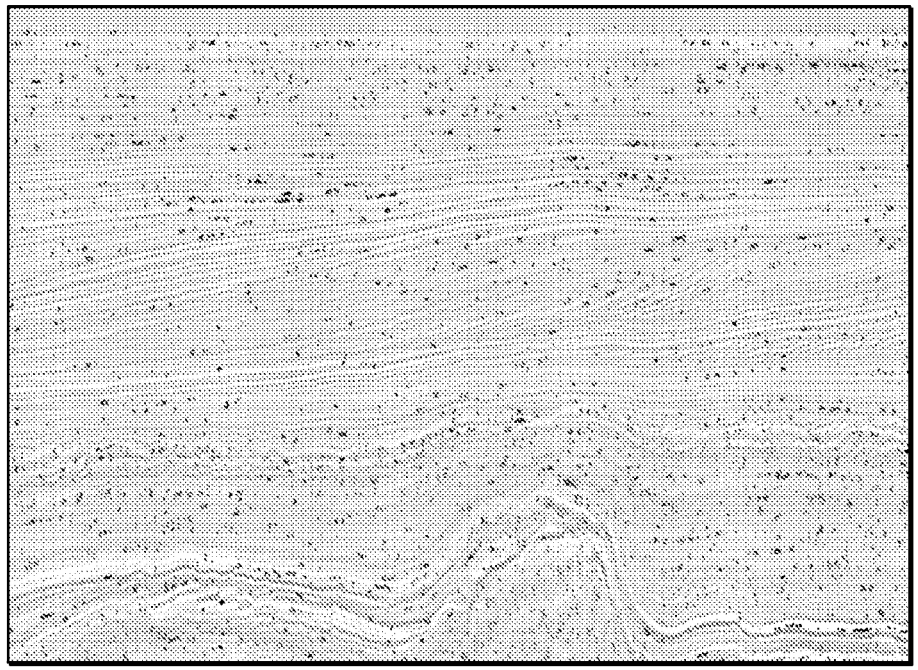
FIG. 10 depicts the seismic cross section of FIG. 8 superimposed with toplaps which have been identified according to one embodiment of the present disclosure.
Figure 11:
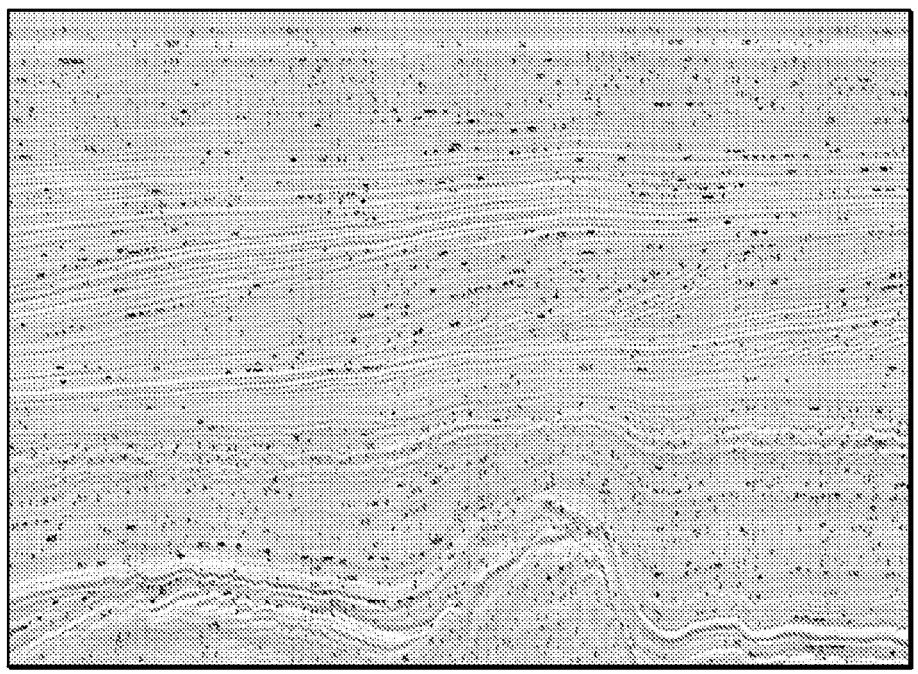
FIG. 11 depicts the seismic cross section of FIG. 8 superimposed with onlaps which have been identified according to one embodiment of the present disclosure.
Figure 12:
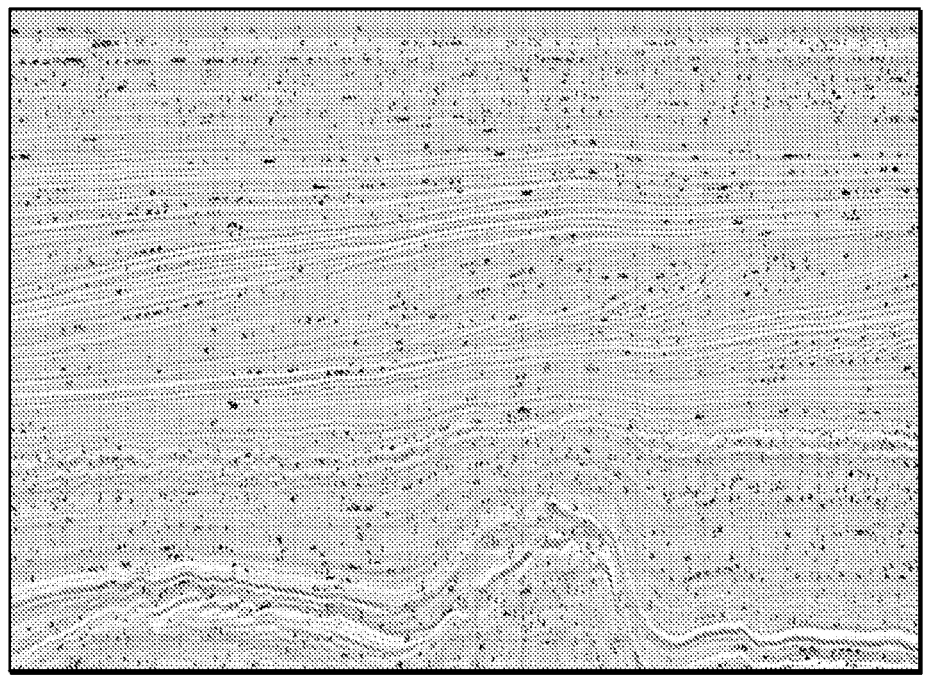
FIG. 12 depicts the seismic cross section of FIG. 8 superimposed with downlaps which have been identified according to one embodiment of the present disclosure.
Figure 13:
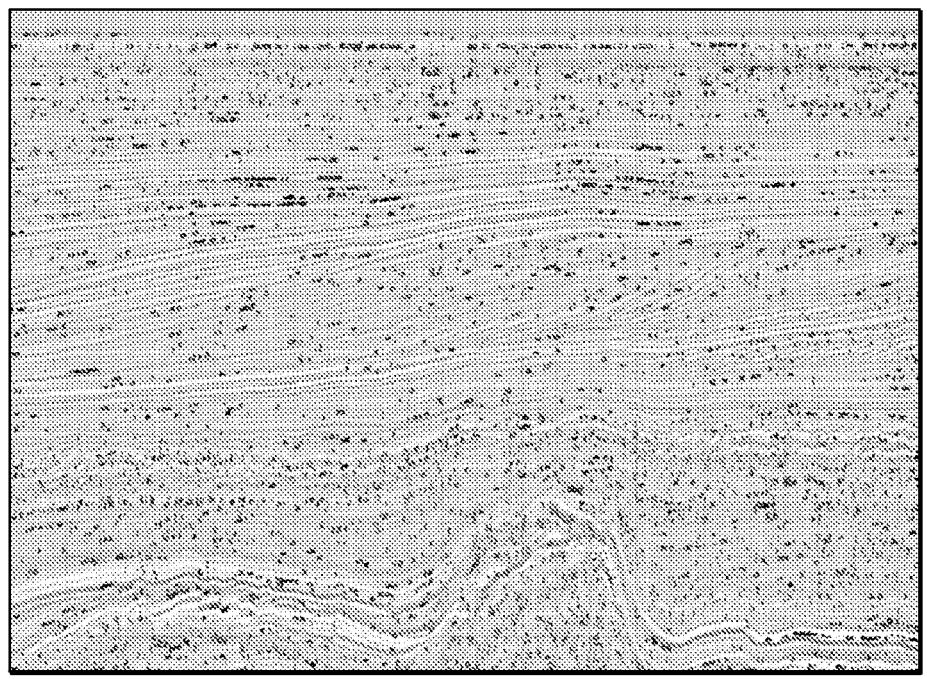
FIG. 13 depicts the seismic cross section of FIG. 8 superimposed with upward terminations which have been identified according to one embodiment of the present disclosure.
Figure 14:
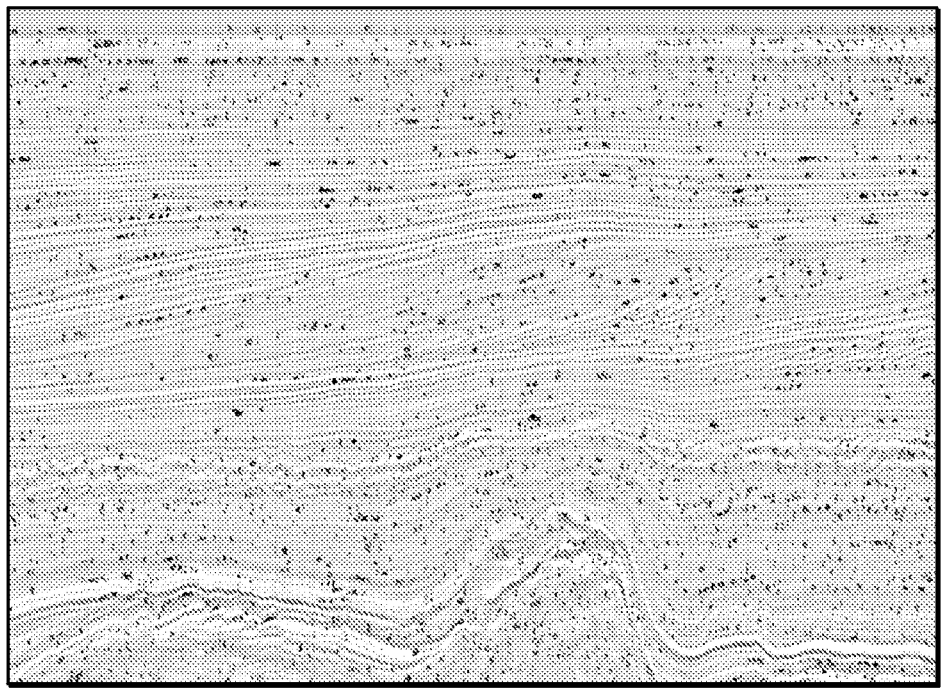
FIG. 14 depicts the seismic cross section of FIG. 8 superimposed with downward terminations which have been identified according to one embodiment of the present disclosure.
Figure 15:
FIG. 15 depicts a truncation density section which has been determined according to one embodiment of the present disclosure.

FIG. 8 shows an example of a seismic section extracted from a larger three-dimensional seismic data volume. In this example, the seismic surfaces were computed by application of a skeletonization algorithm to the entire seismic data volume. The resulting surfaces are evaluated pursuant to an embodiment of the disclosed method to determine and classify seismic terminations. FIG. 9 shows the same cross section but with truncations from the nine nearest slices projected, or superimposed, onto the cross section. In FIG. 9, the depicted truncations represent an optical smash over nine seismic data slices. FIG. 10 shows an optical smash of the identified toplaps. FIG. 11 depicts an optical smash of the identified onlaps, whereas FIG. 12 depicts an optical smash of the identified downlaps. FIGS. 13 and 14 present upward and downward terminations, respectively. The classification into upward and downward terminations is more robust than the classification into truncations, toplaps, onlaps and downlaps because they do not require estimation and comparison of local dips. FIG. 15 presents the truncation density obtained by counting the number of truncations within probes with a size of 21 by 21 by 7 voxels.

In one embodiment of the present disclosure and as described above, a set of surfaces is obtained and edge points are then identified within that set of surfaces. In other embodiments, anomalies in the obtained seismic waveforms are used to seed an automatic event tracker. The automatic event tracker is used to create a set of surfaces which are anchored at the location of the anomalous waveform. Based on the principles described herein, these surfaces may then be analyzed for termination direction and/or termination type. As presented herein, waveform doublets may be used to determine termination direction. In some embodiments, terminations not located within doubleted waveforms are left with an undefined termination direction. In an alternative embodiment, the seismic data is first scanned for doubleted waveforms. In such an embodiment, instead of tracking essentially every surface in the data, only those surfaces that touch a doubleted waveform are tracked. Said differently, the doubleted waveforms are utilized to seed the tracker.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming Additionally, the present invention is in no way limited to implementation in any specific operating system or environment.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

The invention claimed is:

1. A computer-implemented method for analyzing a seismic data volume acquired in a seismic survey to determine potential for hydrocarbon accumulations in an associated subsurface region, the method comprising:
obtaining, with a computer, surfaces describing the seismic data volume;
identifying, with a computer, edge points within the surfaces;
identifying, with a computer, a plurality of seismic terminations, wherein each termination is defined by two edge points defining a first terminated surface and a second terminated surface;
using a computer to determine a termination direction for at least one termination;
generating, with a computer, a subsurface image by optically smashing the plurality of seismic terminations and co-rendering with seismic amplitudes or a seismic section extraction from the seismic data volume; and
causing a well to be drilled into the subsurface region based at least in part on an interpretation of the subsurface image.

2. The method of claim 1, wherein the obtained surfaces are derived from the seismic data volume using skeletonization.

3. The method of claim 1, wherein the obtained surfaces are derived from tracking peaks and troughs within the seismic data volume.

4. The method of claim 1 further comprising scanning the seismic data volume for doubleted waveforms, wherein the obtained surfaces are seeded at the doubleted waveforms.

5. The method of claim 1 further comprising determining a termination type to the at least one termination.

6. The method of claim 5, wherein the first and second terminated surfaces each end on or adjacent to a persistent surface.

7. The method of claim 6, wherein determining the termination type is based upon geometric orientations of the persistent surface and at least one of the first terminated surface or the second terminated surface.

8. A method for producing hydrocarbons comprising:
conducting a seismic survey of a subsurface region;
obtaining an interpretation of the subsurface using the method of claim 1;
and
producing hydrocarbons from the well.

9. A computer-implemented method for analyzing a seismic data volume acquired in a seismic survey to determine potential for hydrocarbon accumulations in an associated subsurface region, the method comprising:
obtaining, with a computer, a set of surfaces describing the seismic data volume;
identifying, with a computer, a plurality of seismic terminations within the set of surfaces;
using a computer to determine a termination direction for at least one termination;
identifying, with a computer, edge points within the set of surfaces, wherein each termination is defined by two edge points defining a first terminated surface and a second terminated surface,
wherein the first terminated surface ends at a doublet and the second terminated surface ends at a nondoublet, and the termination direction is defined in the direction from the second surface to the first surface;
obtaining, with a computer, an interpretation of the subsurface region using the termination direction for at least one termination; and
causing a well to be drilled into the subsurface based at least in part on the interpretation of the subsurface region using the termination direction for the at least one termination.

10. The method of claim 9, wherein the termination direction is selected from a group consisting of upward, downward, and undefined.

11. The method of claim 9, further comprising determining a termination type to the at least one termination.

12. The method of claim 11, wherein the first and second terminated surfaces each end on or adjacent to a persistent surface.

13. The method of claim 11, wherein determining the termination type is based upon the geometric orientations of the first terminated surface and the persistent surface.

14. The method of claim 11, wherein the termination type is selected from a group consisting of truncation, toplap, onlap, and downlap.

15. The method of claim 9, further comprising identifying edge points within the set of surfaces, wherein each termination is defined by two vertically adjacent edge points defining a first terminated surface and a second terminated surface.

16. A computer-implemented method for analyzing a seismic data volume acquired in a seismic survey to determine potential for hydrocarbon accumulations in an associated subsurface region, the method comprising:
   obtaining, with a computer, a set of surfaces describing the seismic data volume;
   identifying, with a computer, a plurality of seismic terminations within the set of surfaces;
   using a computer to determine a termination direction for at least one termination;
   identifying, with a computer, edge points within the set of surfaces, wherein each termination is defined by two edge points defining a first terminated surface and a second terminated surface;
   determining a termination type to the at least one termination,
   wherein the determining the termination type includes,
      estimating a first angle defined by a surface normal direction of the first terminated surface, and
      estimating a second angle defined by a surface normal direction of the persistent surface,
      wherein the termination type is based upon the termination direction, the first angle, and the second angle;
   obtaining, with a computer, an interpretation of the subsurface region using the termination type for the at least one termination; and
   causing a well to be drilled into the subsurface region based at least in part on the interpretation of the subsurface using the termination type for at least one termination.

17. A computer-implemented method for analyzing a seismic data volume acquired in a seismic survey to determine potential for hydrocarbon accumulations in an associated subsurface region, the method comprising:
   obtaining, with a computer, surfaces describing the seismic data volume;
   identifying, with a computer, edge points within the surfaces;
   identifying, with a computer, a plurality of seismic terminations, wherein each termination is defined by two edge points defining a first terminated surface and a second terminated surface;
   using a computer to determine a termination direction for at least one termination;
   determining, with a computer, a termination type to the at least one termination,
   wherein the first and second terminated surfaces each end on or adjacent to a persistent surface,
   wherein the determining the termination type is based upon geometric orientations of the persistent surface and at least one of the first terminated surface or the second terminated surface,
   wherein the determining the termination type includes, comprises:
      estimating a first angle defined by a surface normal direction of the first terminated surface, a surface normal direction of the second terminated surface, or the surface normal direction of the first and second terminated surfaces, and
      estimating a second angle defined by a surface normal direction of the persistent surface,
      wherein the termination type is based upon the termination direction, the first angle, and the second angle;
   obtaining, with a computer, an interpretation of the subsurface region using the termination type for the at least one termination; and
   causing a well to be drilled into the subsurface based at least in part on the interpretation of the subsurface region using the termination type for the at least one termination.

* * * * *